United States Patent [19]

Threewitt et al.

[11] Patent Number: 4,719,593
[45] Date of Patent: Jan. 12, 1988

[54] APPARATUS FOR GENERATING DIGITAL TIMING WAVEFORMS

[75] Inventors: N. Bruce Threewitt, Fremont; Jimmy R. Madewell, San Jose, both of Calif.

[73] Assignee: Advanced Micro Devices, Inc., Sunnyvale, Calif.

[21] Appl. No.: 628,707

[22] Filed: Jul. 9, 1984

[51] Int. Cl.[4] ................................................ G06F 7/70
[52] U.S. Cl. .................................... 364/900; 364/715; 364/718
[58] Field of Search ... 364/718, 715, 569, 200 MS File, 364/900 MS File

[56] References Cited

U.S. PATENT DOCUMENTS

| | | | |
|---|---|---|---|
| 3,689,914 | 9/1972 | Butler | 364/718 |
| 3,763,364 | 10/1973 | Deutch et al. | 364/718 |
| 4,168,527 | 9/1979 | Winkler | 364/900 |
| 4,198,683 | 4/1980 | Dagostino | 364/900 |
| 4,222,108 | 9/1980 | Braaten | 364/608 |
| 4,225,936 | 9/1980 | Lesche | 364/715 |
| 4,338,674 | 7/1982 | Hamada | 364/718 |
| 4,404,644 | 9/1983 | Howie | 328/14 |
| 4,513,387 | 4/1985 | Neyer | 364/718 |

Primary Examiner—Raulfe B. Zache
Assistant Examiner—Emily Y. Chan
Attorney, Agent, or Firm—Patrick T. King; Mark A. Haynes; J. Vincent Tortolano

[57] ABSTRACT

A programmable event generator for generating digital timing waveforms in response to a triggering signal includes one programmable read-only memory for storing and outputting data words corresponding to the digital timing waveforms and next address words to address another of the data words, a storage register for temporarily storing and outputting any one of the data words and next address words, another mapping programmable read-only memory for storing and outputting starting address words to start the addressing of the one programmable read only memory, a multiplexer to select either a starting address word or a next address word to address the one programmable read-only memory, and a programmable control circuit, responsive to the triggering signal, for clocking the storage register at a programmed clock frequency.

24 Claims, 5 Drawing Figures

APPARATUS FOR GENERATING DIGITAL TIMING WAVEFORMS

BACKGKROUND OF THE INVENTION

1. Field of the Invention

The present invention relates generally to apparatus for generating digital timing waveforms and, more particularly, to general purpose timing signal generators for generating complex digital timing waveforms.

2. Background Art

Timing waveforms or signals are used in a wide variety of digital systems to control the processing of data. For example, computer memory systems typically have components such as a memory, bus buffer, error detection and correction unit, and memory timing controller, which must utilize precise timing waveforms to read, write and correct the data accurately. One computer memory system may require different timing waveforms than another computer memory system depending, for example, on the particular applications or uses of each.

A prior device that has been used to produce timing waveforms is known as a delay line. Typically, the delay line has a plurality of output taps spaced in series along the line. In operation generally, an input signal is conducted through the delay line and at each tap an output timing signal may be taken. Each output timing signal is synchronized to the input signal, but delayed relative to the time at which the input signal is received.

One problem with a delay line is that errors can be accumulative. Thus, if there is a delay error at the first tap in the series of taps, this error will accumulate as the delayed input signal is taken out as a timing signal at the succeeding taps. In addition, the delay line is a relatively expensive device to manufacture, resulting in part from the need to adjust manually the taps to provide the precise delay.

Yet another problem with the delay line is that the timing signals outputted at the respective taps always resemble the input signal. That is, these timing signals are the same as the input signal, but merely delayed, so that the timing edges of the outputted signals, i.e., the leading or trailing edges, are related to the timing edges of the input signal. This is disadvantageous for many digital systems which require synthesized timing signals, i.e., timing signals whose timing edges are not so related to the timing edges of the input signal. Timing signals can be synthesized by coupling the signals outputted from the taps of the delay line to a combinatory logic circuit which then logically combines these output signals to generate the desired synthesized timing signals. However, the use of a combinatory logic circuit adds to the cost of the overall timing signal generator and undesirably reduces the speed by which the synthesized timing signals are outputted relative to the time at which the input signal is received by the delay line.

SUMMARY OF THE INVENTION

The present invention includes an apparatus for generating digital timing waveforms in response to a triggering signal, comprising means for storing and outputting words including data words corresponding to the digital timing waveforms, and means, responsive to the triggering signal, for controlling the storing and outputting means to output the words.

In accordance with the present invention, by storing and controlling the output of the data words, a large number of different and complex timing waveforms can be synthesized to provide the timing required for a given digital system. In addition, while the timing waveforms may be synchronized to the triggering signal, the former need not resemble the latter. Thus, for example, the apparatus of the present invention may be used to replace a delay line or a delay line coupled to a combinatory logic circuit to produce the digital timing waveforms.

DETAILED DESCRIPTION OF THE DRAWINGS

Figure 1:
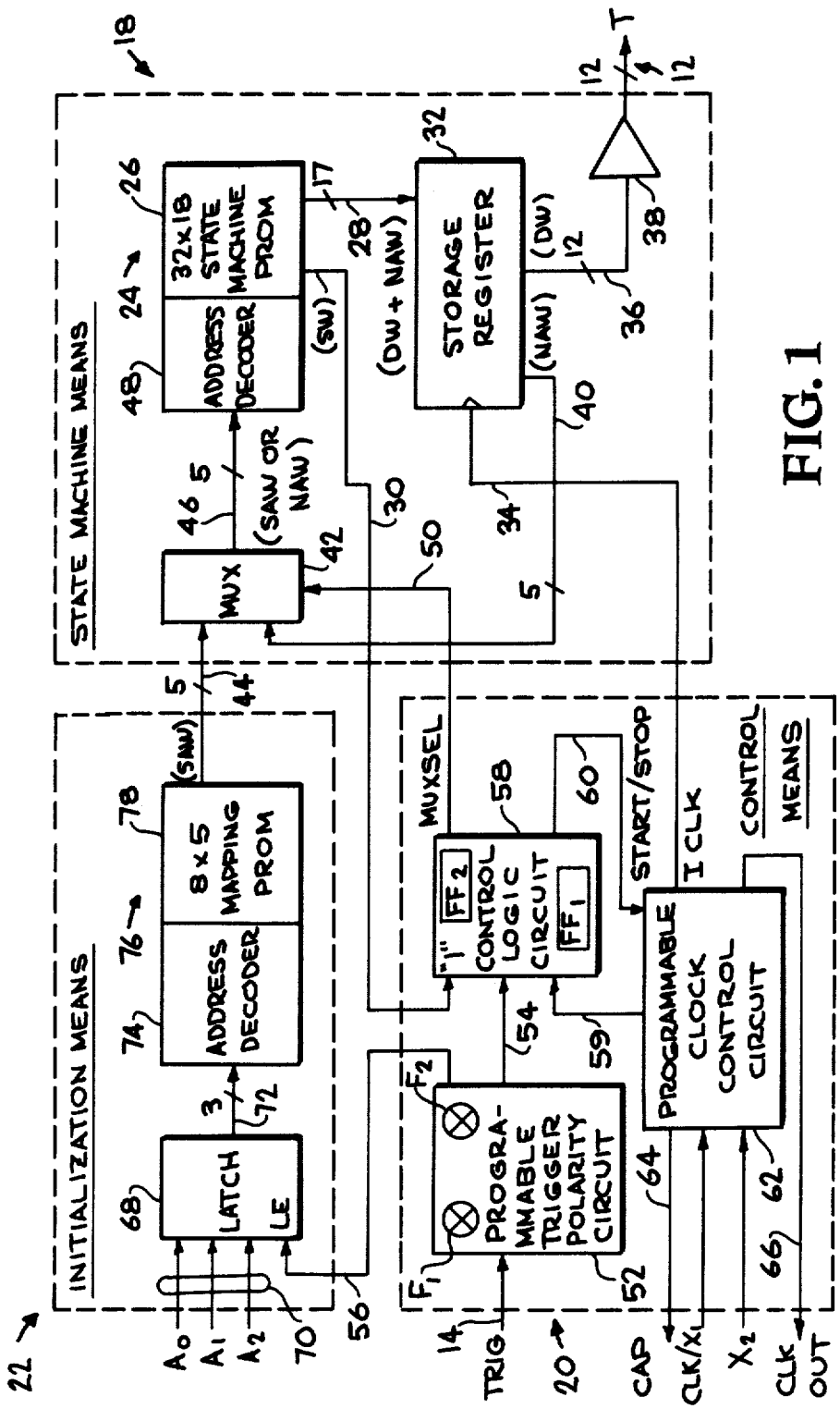
FIG. 1 is a block diagram of one embodiment of the present invention.
Figure 2:
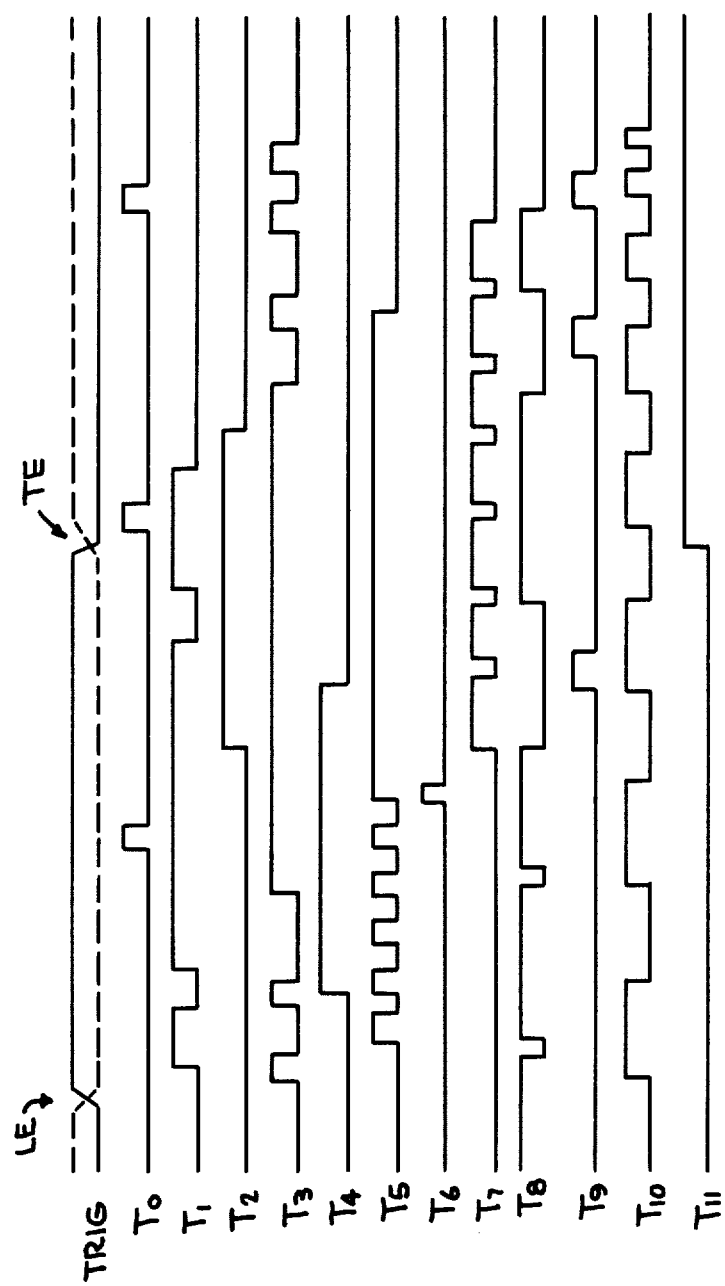
FIG. 2 is a timing diagram showing one example of many digital timing waveforms that may be produced by the embodiment of FIG. 1.

FIG. 1 shows an apparatus 10 for generating a plurality of digital timing waveforms indicated generally as T on a plurality of output lines shown generally at 12. These timing waveforms T are generated in response to a triggering signal TRIG on an input line 14. As indicated in FIG. 2, the present invention will be described based on producing twelve timing on twelve waveforms $T_0$–$T_{11}$ on twelve parallel output lines 12 respectively; however, the principles of the present invention may be used to generate any number of timing waveforms T on any number of lines 12, in parallel or in series. Furthermore, FIG. 2 shows only one example of the many different timing waveforms $T_0$–$T_{11}$ that may be generated by the apparatus 10, as will be further described below.

Also, FIG. 2 shows in solid lines one polarity of the signal TRIG and in dotted lines another polarity of the signal TRIG. For each polarity of the signal TRIG there is a leading edge LE and a trailing edge TE. As will be described below, the apparatus 10 may respond to either polarity of the signal TRIG, with the leading edge LE commencing the generation of the timing waveforms $T_0$–$T_{11}$. In addition, FIG. 2 shows the timing waveforms $T_0$–$T_{11}$ as continuing to be generated subsequent to the occurrence of the trailing edge TE; however, the apparatus 10 may respond to the latter to inhibit further generation of the timing waveforms $T_0$–$T_{11}$.

In one particular embodiment, the apparatus 10 is a programmable event generator 16 in which each pulse of the timing waveforms $T_0$–$T_{11}$ corresponds to an event that should occur in an overall system (not shown) in which the generator 16 might be used. The generator 16 includes state machine means shown generally at 18 for outputting the timing waveforms $T_0$–$T_{11}$ on lines 12, together with control means shown generally at 20 for controlling the state machine means 18 in response to the signal TRIG on line 14 to output the timing waveforms $T_0$–$T_{11}$. The programmable 16 also includes initialization means shown generally a 22 and coupled to the state machine means 18 for initializing the outputting of the timing waveforms $T_0$–$T_{11}$.

Figure 3:
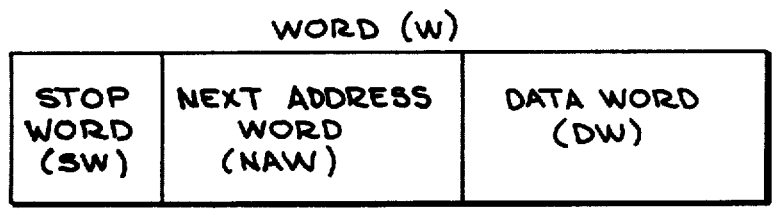
FIG. 3 illustrates one example of a digital word used in accordance with the principles of the present invention.

The state machine means 18 has an addressable memory 24, such as a programmable readonly memory (PROM) 26, for storing a plurality of words W. For example, the PROM 26 may store thirty-two words W, each of 18-bit length. As one example, FIG. 3 shows the content of each word W, which includes a data word DW of twelve bits, a next address word NAW of five bits and a stop word SW of one bit. The twelve bits of the data word DW correspond, respectively, to the twelve timing waveforms $T_0$–$T_{11}$ produced on the parallel output lines 12. The next address word NAW defines an address to any other of the words W that is stored in the PROM 26. The stop word SW, if at one logic level, e.g., logic 1, is used to stop or inhibit the generation of the timing waveforms $T_0$–$T_{11}$, as will be further described. As mentioned above, alternatively the trailing edge TE of the signal TRIG may be used to so inhibit the timing waveforms $T_0$–$T_{11}$.

With reference again to FIG. 1, each data word DW and next address word NAW are read from the PROM 26 on output lines 28, while the stop word SW is read from the PROM 26 on an output line 30. A storage register 32 is coupled to the lines 28 to receive and temporarily store the data word DW and next address word NAW of any one word W stored in the PROM 26. The storage register 32 is clocked by an internal clock ICLK on a line 34 to output the data word DW on twelve parallel lines 36 that are coupled to the lines 12 via a similar number of output drivers 38, respectively. The storage register 32 also outputs the next address word NAW on lines 40 to address another of the words W stored in the PROM 26. One reason for using the storage register 32 is to provide registered or "glitch-free" outputs on lines 36 and lines 40. However, if such glitch-free outputs are not necessary, the storage register 32 need not be used, with each data word DW being outputted directly from the PROM 26 onto lines 36 along with each next address word NAW onto lines 40.

The state machine means 18 also includes a multiplexer 42 having an address input coupled to the lines 40 to receive the next address word NAW, another address input coupled to lines 44 to receive a starting address word SAW from the initialization means 22, and an output coupled to lines 46 which are coupled to an address decoder 48. The multiplexer 42 also has a select input coupled to a line 50 carrying a signal MUXSEL. The multiplexer 42 responds to the signal MUXSEL to couple either lines 40 or lines 44 to lines 46, whereby lines 46 carry either a starting address word SAW or a next address word NAW, as will be further described. The address decoder 48 decodes the starting address word SAW or the next address word NAW on lines 46 to access a word W stored in PROM 26, which is then read onto lines 28 and line 30.

Thus, to describe generally the operation of the state machine means 18, assume that the PROM 26 has been programmed with words W. As will be further described, the multiplexer 42 will first couple lines 44 to lines 46, whereby address decoder 48 will decode a "start address" defined by the SAW to access a first or starting word W in the PROM 26. Then, as the storage register 32 is clocked by a pulse of the internal clock ICLK on line 34, the next address word NAW and the data word DW are temporarily stored in the storage register 32 via lines 28, with the stop word SW being outputted on line 30. Thus, the data word DW of this first word W is outputted onto lines 36 and driven onto lines 12, whereby respective pulses of the timing waveforms $T_0$–$T_{11}$ are produced in accordance with the logic 1 or logic 0 state of the twelve bits of the data word DW.

Also, the next address word NAW is fed back over lines 40 to the multiplexer 42, which has now been set via the signal MUXSEL on line 50 to couple lines 40 to lines 46. Therefore, the address decoder 48 now decodes the next address word NAW to access another word W stored in the PROM 26. Then, upon the next clock pulse of the internal clock ICLK, this other word W is read from the PROM 26, so that the corresponding next address word NAW and data word DW are temporarily stored in the storage register 36 while the stop word SW is provided on line 30. Consequently, for this next pulse of the internal clock ICLK, pulses of the timing waveforms $T_0$–$T_{11}$ are produced on lines 12 via drivers 38 in accordance with the logic 1 or logic 0 of the bits of the data word DW. Also, the next address word NAW is fed back via lines 40 and coupled through the multiplexer 42 onto lines 46 to repeat the process by accessing another word W. This process continues, until the stop word SW of, for example, a logic 1 is produced on line 30, or until the trailing edge TE of the signal TRIG is provided on line 14, as will be further described.

The control means 20 includes a programmable trigger polarity circuit 52 which receives the signal TRIG on line 14 and, in response, produces any one of several control signals on an output line 54. The circuit 52 has a polarity fuse $F_1$ and a stop-trig fuse $F_2$. If not "blown", the fuse $F_1$ will enable the circuit to respond to the leading edge LE of one polarity of the signal TRIG, while if blown or programmed, the fuse $F_1$ will enable the circuit 52 to respond to the leading edge LE of the other polarity of the signal TRIG. The stop-trig fuse $F_2$, if blown, will enable the circuit 52 to respond to the trailing edge TE of the signal TRIG to inhibit the generation of the timing waveforms $T_0$–$T_{11}$; otherwise, the trailing edge TE has no effect. The circuit 52, in response to the leading edge LE of the signal TRIG, also produces a latch enable signal on an output line 56 for use as will be described below.

The control means 20 also includes a control logic circuit 58 having an input coupled to the line 30 carrying the stop word SW, an input coupled to the line 54 carrying the control signals produced by the trigger polarity circuit 52, and an input coupled to a line 59 carrying a synchronizing signal. The control logic circuit 58 is used to generate the signal MUXSEL on the line 50 and a signal START/STOP on a line 60. The control logic circuit 58 has a flip-flop $FF_1$ which responds to the control signals on line 54 or the stop word SW on line 30 to produce the signal START/STOP on line 60, while another flip-flop $FF_2$ is clocked by one of the control signals on line 54 to produce a logic 1 signal MUXSEL on line 50, as will be further described.

Figure 4:
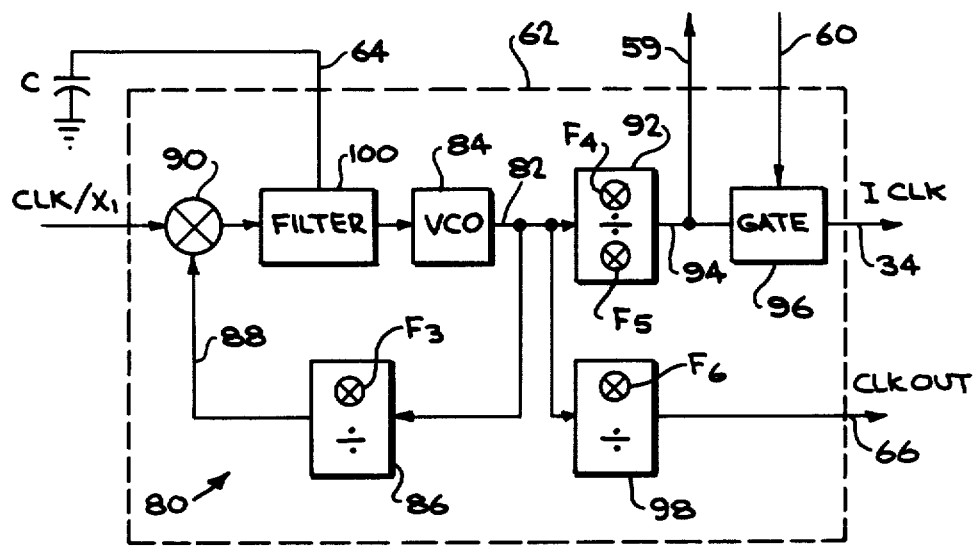
FIG. 4 shows a more detailed block diagram of a clock control circuit of the embodiment of FIG. 1.

A programmable clock control circuit 62, to be described more fully in relation to FIG. 4, is controlled by the signal START/STOP on line 60 to produce the internal clock ICLK on line 34. The clock control circuit 62 has two inputs coupled to respective lines $CLK/X_1$ and $X_2$ for receiving either an external reference clock CLK on line $CLK/X_1$ or an external frequency reference from a crystal (not shown) coupled across lines $CLK/X_1$, and $X_2$, from which the internal clock ICLK is produced, as well as the synchronizing signal on line 59 leading to the clock control circuit 58 to synchronize the circuit 58. The programmable clock control circuit 62 also is coupled to an external capacitor over a line 64, as will be further described below. Further, the programmable clock control circuit 62 may output a system clock CLKOUT on an output line 66 to provide system timing for an overall system (not shown) in which the programmable event generator 16 might be used.

Thus, in the operation generally of the control means 20, in response to the leading edge LE of the signal TRIG, the programmable trigger polarity circuit 52 produces a control signal on line 54 and the latch enable signal on line 56. In response to the control signal on line 54, the flip-flop $FF_1$ of the control logic circuit 58 will produce the signal START/STOP, e.g., a logic 1, on line 60, whereby the programmable clock control circuit 62 will then be enabled to provide the internal clock ICLK on line 34. Also in response to this control signal line 54, the flip-flop $FF_2$ of the control logic circuit 58 will clock in a logic 1 to produce a logic 1 signal MUXSEL on line 50.

Furthermore, at an appropriate time, the flip-flop $FF_1$ of the control logic circuit 58 will produce the signal START/STOP, e.g., logic 0, on line 60 to stop the generation of the internal clock ICLK in response to the logic 1 stop word SW on line 30. Alternatively, if so configured, the programmable trigger polarity circuit 52 will respond to the trailing edge TE of the signal TRIG to produce a control signal on line 54, whereby the flip-flip $FF_1$ will respond to produce the signal START/STOP of logic 0 to inhibit the internal clock ICLK.

The initialization means 22 has a latch 68 for latching an externally received address of, for example, three bit length $A_0$–$A_2$ over three respective lines 70. The latch 68 latches the external address $A_0$–$A_2$ in response to the latch enable signal on line 56 and outputs this latched address over three lines 72 to an address decoder 74.

An addressable memory 76, such as a mapping programmable read-only memory or PROM 78, is used for storing a number of starting address words SAW that may be read onto the lines 44. For example, the mapping PROM 76 may be an 8×5 mapping PROM 78 for storing eight starting address words SAW each of 5-bit length.

In the operation generally of the initialization means 22, when a given external address $A_0$–$A_2$ is received on the lines 70, the latch 68 outputs this address $A_0$–$A_2$ onto lines 72. Consequently, the address decoder 74 decodes this address $A_0$–$A_2$ to access a specified starting address word SAW in the PROM 76, whereby this SAW is then read onto lines 44.

In the overall operation of the programmable event generator 16, assume that the state machine PROM 26 has been programmed with up to thirty-two words W, that the mapping PROM 78 has been programmed with up to eight starting address words SAW, and that the programmable trigger polarity circuit 52 has been programmed to respond to the leading edge LE of the signal TRIG of the desired polarity, but has not been programmed to respond to the trailing edge TE of the signal TRIG to inhibit the generation of the timing waveforms $T_0$–$T_{11}$. As will be described below, also assume that the programmable clock control circuit 62 has been programmed to produce an internal clock ICLK of, for example, 100 MHz or a 10 ns period in response to the external clock CLK which is being supplied on line CLK/$X_1$. Furthermore, assume that the programmable event generator 16 has been reset, so that the signal MUXSEL is a logic 0, whereby the multiplexer 42 is coupling lines 44 to lines 46.

Then, in operation, the external address $A_0$–$A_2$ is supplied on the lines 70 to latch 68, whereby the address decoder 74 decodes this address $A_0$–$A_2$ to access a desired starting address word SAW in the mapping PROM 78. Accordingly, this starting address word SAW is read onto lines 44 and, via multiplexer 42, onto lines 46, so that address decoder 48 at this time decodes this SAW to access one of the thirty-two words W stored in the PROM 26.

Next, the signal TRIG is supplied to the programmable trigger polarity circuit 52. Upon the occurrence of the leading edge LE of the signal TRIG, the latch enable signal on line 56 is produced to latch the external address $A_0$–$A_2$ in latch 68. This latching stabilizes the stored address $A_0$–$A_2$, so that a stabilized starting address word SAW is read from the PROM 78, resulting in a stabilized word W being read from the PROM 26. At this time also, the programmable trigger polarity circuit 52 produces a control signal on line 54 that is stored in the flip-flop $FF_1$, resulting, for example, in a logic 1 signal START/STOP on line 60 being generated. In addition, the flip-flop $FF_2$ is clocked by this control signal on line 54 to produce a logic 1 signal MUXSEL on line 50, whereby lines 40 are now coupled to lines 46.

In response to the logic 1 signal START/STOP, the programmable clock control circuit 62 produces the internal clock ICLK on the line 34, which then clocks the storage register 32, whereby the timing waveforms $T_0$–$T_{11}$ begin to be generated pursuant to the data word DW currently stored in the register 32. Also, the multiplexer 42 couples the next address word NAW on the lines 40 to the lines 46. Then, as each clock pulse of the internal clock ICLK is produced on the line 34, a word W will be read from the PROM 26, resulting in the continued production of the timing waveforms $T_0$–$T_{11}$ via the data word DW and the accessing of another word W via the next address word NAW.

The above process continues until a stop word SW of, for example, a logic 1 is provided on the line 30. In response, the flip-flop $FF_1$ produces a logic 0 signal START/STOP on the line 60, whereby the internal clock ICLK is inhibited. Consequently, the clocking of the storage register 32 ceases, resulting in the timing waveforms $T_0$–$T_{11}$ remaining in the states corresponding to the data word DW then stored in the register 32 until the programmable event generator 16 is restarted. Alternatively, if the programmable trigger polarity circuit 52 is so programmed, the occurrence of the trailing edge TE of the signal TRIG results in a control signal on line 54 being generated, whereby in response the flip-flop $FF_1$ produces the logic 0 signal START/STOP to inhibit the internal clock ICLK.

FIG. 4 shows a more detailed block diagram of one embodiment of the programmable clock control circuit 62. This circuit 62 includes a portion of a phase-locked loop 80 that responds to, for example, the externally applied clock CLK on line CLK/$X_1$ to produce an oscillating signal on a line 82. The phase-locked loop 80 has a voltage-controlled oscillator 84 producing the oscillating signal on line 82 and which is, for example, designed to run at a nominal frequency of 100 MHz. The phase-locked loop 80 also has, for example, a programmable multiplication factor of 5 or 10 which is provided by programming a feedback divider 86 to divide by 5 or 10. Thus, if the external clock CLK on line CLK/X$_1$ is at 10 MHz, the divider 86 will be programmed to divide the 100 MHz signal on line 82 by 10, to output on a line 88 a 10 MHz signal that is phase compared with the 10 MHz signal on line CLK/X$_1$ by a phase comparator 90 in accordance with conventional phase-locked loop principles. If the external clock CLK is at 20 MHz, the divider 86 will be programmed to divide the 100 MHz signal on line 82 by 5, to output on line 88 a 20 MHz signal for phase comparison purposes. The divider 86 may be programmed by providing a fuse F$_2$ which is blown or not blown, depending on the desired multiplication factor.

The programmable clock control circuit 62 also has a programmable divider 92 which divides the 100 MHz signal on line 82 to produce the internal clock ICLK on the line 34 via an output line 94 and gate 96. The line 60 is coupled to gate 96 to enable or disable the gate 96 in accordance with the signal START/STOP. Also, the line 94 is coupled to the line 59 (see FIG. 1) to provide the synchronizing signal for the control logic circuit 58. For example, the programmable divider 92 can have two fuses F$_4$ and F$_5$ which, if blown or not, will cause the divider 92 to divide the 100 MHz signal on line 82 by 1 of 4 values.

Furthermore, the programmable clock control circuit 62 has a programmable divider 98 for dividing the 100 MHz signal on line 82 to produce the signal CLKOUT on line 66. For example, the divider 98 has a fuse F to divide the 100 MHz signal on line 82 by 5 or 10. If the fuse F$_6$ is not blown, the divider 98 will, for example, divide by 5 to output on the line 66 the signal CLKOUT of 20 MHz, whereas, if the fuse F$_6$ is blown, the divider 98 will divide by 10 to produce the signal CLKOUT of 10 MHz.

As also shown, a portion of the phase-locked loop 80, particularly a capacitor C which stores a phase error signal produced by the output of the phase detector 90, is externally coupled over the line 64 to drive the VCO 84 via a filter 100. The reason for this external connection of the capacitor C is that the overall programmable event generator 16 can be implemented as an integrated circuit, but for conventional reasons it is possible, but not advantageous, to include the capacitor C as part of the integrated circuit.

The programmable event generator 16 typically may be manufactured and sold to a user in an unprogrammed state. That is, the PROM 26 and the PROM 78 will not be programmed with the words W and starting address words SAW, nor will the fuses F$_1$-F$_6$ be blown. The user may then program the PROM 26 and the PROM 78, as well as selectively blow the fuses F$_1$-F$_6$ to configure the programmable event generator 16 and generate the timing waveforms T$_0$-T$_{11}$, as desired.

Figure 5:
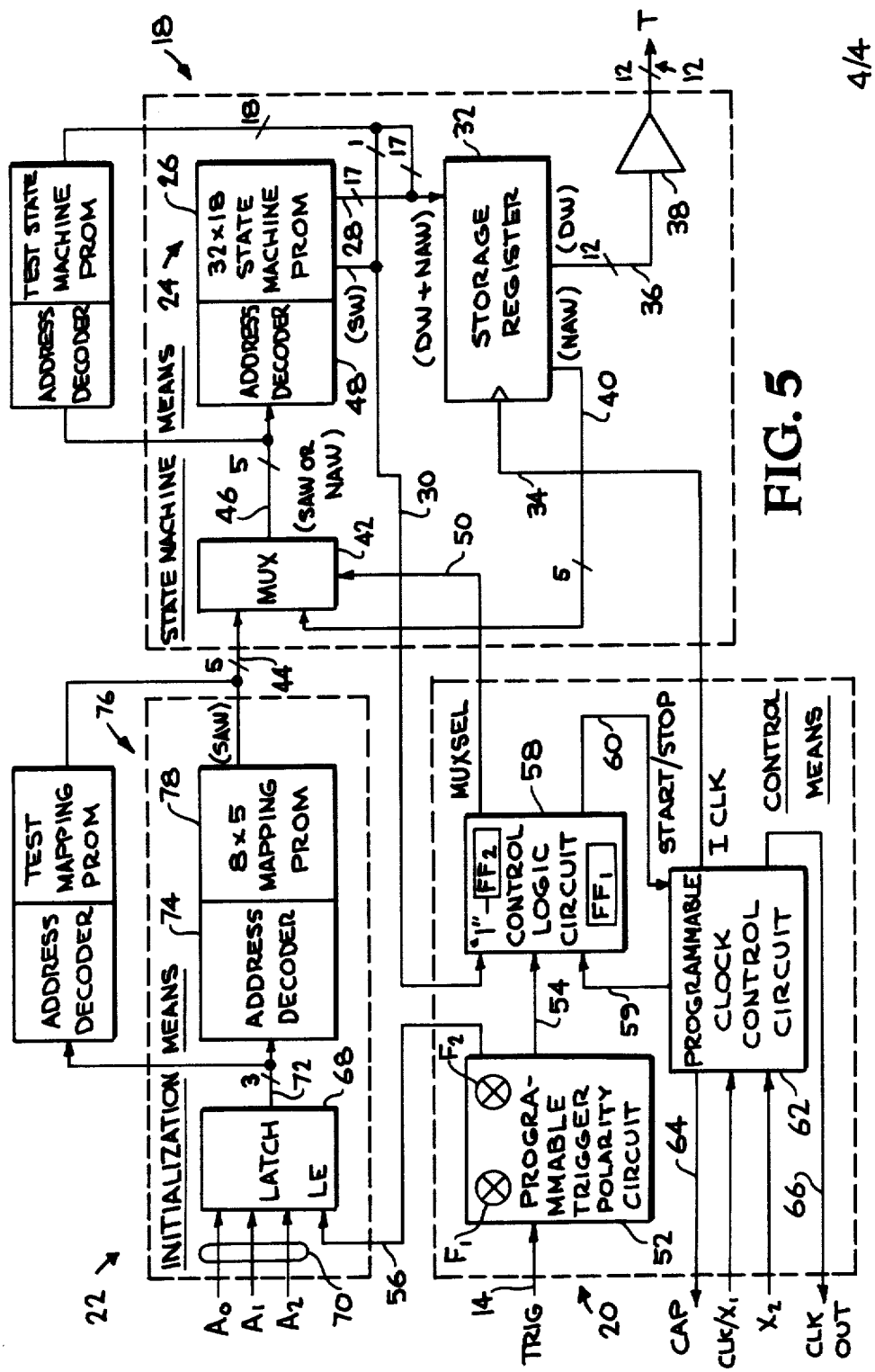
FIG. 5 illustrates a block diagram of other apparatus of the present invention used for testing purposes.

FIG. 5 shows the same programmable event generator 16 as in FIG. 1, except that the generator 16 also may be manufactured and sold with a test PROM 26' and associated address decoder 48', coupled to lines 28, 30 and lines 46 as shown, bypassing the PROM 26 and address decoder 48. The generator 16 also then has a test mapping PROM 78' and corresponding address decoder 74' coupled to lines 44 and lines 72 as shown, bypassing the mapping PROM 78 and address decoder 74. The purpose of providing these additional components is to test the programmable event generator 16 by simulating, prior to programming, the operation of the generator 16 as if it had been programmed as described above. Two tests that may be performed are a functional test of the overall programmable event generator 16 and a high-frequency test of the phase-locked loop 80, as will now be described.

The test PROM 26' may, for example, be programmed with six test words W' (not shown) each of 18-bit length having a 12-bit data word DW', a 5-bit next address word NAW' and a 1-bit stop word SW', in which one stop word SW' has a logic 1. The test mapping PROM 78' may, for example, be programmed with two starting address words SAW' (not shown) each of 5-bit length.

To test if the programmable event generator 16 will function correctly after it is programmed, a relatively slow clock may be used on line CLK/X$_1$ to bypass the phase-locked loop 80 (see FIG. 4) by closing a normally open external switch (not shown) leading to line 94, i.e., the input to gate 96, and, thereby, provide a slow internal clock ICLK on line 34. Also, one bit of the external address A$_0$-A$_2$, e.g, bit A$_0$, is provided on lines 70 at a voltage higher than the normal operating voltage to turn off the address decoder 74 and mapping PROM 78, while bits A$_1$-A$_2$ are in their normal voltage state to address instead the test mapping PROM 78' via the address decoder 74'. Consequently, when the leading edge LE of the signal TRIG is then applied to line 14, the data words DW' will be outputted on lines 12 at a slow rate set by the internal clock ICLK in a manner previously described, whereby test timing waveforms T'$_0$-T'$_{11}$ (not shown) can be detected. When the logic 1 stop word SW' is produced on line 30, this operation of the programmable event generator 16 will stop. Thus, by detecting the test timing waveforms T'$_0$-T' and determining if they are the expected waveforms T'$_0$-T'$_{11}$, the basic functioning of the programmable event generator 16 can be tested before it is programmed.

As previously mentioned the phase-locked loop operates at a high frequency, e.g., 100 MHz. Therefore, to test this high-frequency operation, a crystal (not shown) of appropriate frequency is 15 coupled to lines CLK/X$_1$ and X$_2$. Then, the signal CLKOUT may be detected to determine if proper frequency multiplication is being performed by the phase-locked loop 80. In addition, overall high-frequency operation of the programmable event generator 16 can be tested by again supplying the external address A$_0$-A$_2$ on lines 70 with bit A$_0$ at a higher voltage and supplying the signal TRIG to line 14, whereby the test timing waveforms T'$_0$-T'$_{11}$ outputted on lines 12 can be detected.

While the PROM 26 and PROM 78 have been described for storing the words W and starting address words SAW, alternative programmable memory devices may be used within the principles of the present invention. Also, though fuses F$_1$-F$_6$ have been described, other types of commonly known programmable elements may be used in lieu of these fuses F$_1$-F$_6$.

The foregoing description of preferred embodiments of the invention has been presented for purposes of illustration and description. It is not intended to be exhaustive or to limit the invention to the precise form described, and many modifications and variations are possible in light of the above teaching. The embodiments were chosen and described in order to best explain the principles of the invention and its practical application to thereby enable others skilled in the art to best utilize the invention in various embodiments and with various modification as are suited to the particular use contemplated. It is intended that the scope of the invention be defined by the claims appended hereto.

We claim:

1. A programmable event generator, implemented as an integrated circuit, for outputting digital timing waveforms in response to an externally applied triggering signal having a leading edge and a trailing edge, an externally applied address and an externally applied clock, comprising:
    (a) state machine means for generating the digital timing waveforms, including
        (i) a first addressable and programmable read-only memory means for storing a plurality of words, each one of the words having a data word corresponding to the digital timing waveforms and a next address word to access another of the data words, and at least one of the words having a stop word;
        (ii) a storage register, having a clock input and coupled to said first addressable and programmable read-only memory means, for temporarily storing and then outputting a data word and next address word, and
        (iii) a multiplexer having a first input, a second input, a select input and an output;
    (b) initialization means for producing any one of a plurality of starting addresses in response to the externally applied address, including
        (i) a means for temporarily holding the externally applied address; and
        (ii) a second addressable and programmable read-only memory means for storing and outputting any one of a plurality of starting address words in response to the externally applied address in the holding means, said first input connected to receive the one starting address word and said second input connected to receive the next address word; and
    (c) control means for controlling said state machine means and said initialization means in response to the externally applied triggering signal and the externally applied clock signal, including
        (i) trigger circuit means, responsive to the leading edge of the externally applied triggering signal, for generating a first signal to enable said holding means and for generating a second signal;
        (ii) control logic circuit means, in communication with the storage register, for generating a select signal and a start signal in response to the second signal and for generating a stop signal in response to the stop word, said select input receiving the select signal so that said multiplexer couples said first input to said output in the absence of the select signal and couples said second input to said output in the presence of the select signal; and
        (iii) programmable clock control circuit means for generating an internal clock at a selected frequency in response to the externally applied clock said programmable clock control circuit means being enabled in response to the start signal and being disabled in response to the stop signal, and said clock input of said storage register receiving the internal clock.

2. A programmable event generator, according to claim 1, wherein said trigger circuit means is programmable to generate a third signal in response to the trailing edge of the triggering signal, and wherein said control logic circuit means generates the stop signal in response to the third signal.

3. A programmable event generator, according to claim 1, wherein said programmable clock control circuit means is programmable to generate a clockout signal that is externally outputted from the elected event generator at a frequency determined by user programming.

4. The apparatus of claim 1, wherein the means for temporarily holding comprises a latch.

5. A programmable event generator for generating digitial timing waveforms in response to a triggering signal, comprising:
    (a) first programmable and addressable means for providing a words including data words corresponding to the digital timing waveforms and next address words to access another of the data words, including
        (i) a first addressable memory for storing the words at addresses identified by address words; and
        (ii) a storage means coupled to said first addressable memory and responsive to a clocking signal, for temporarily storing and outputting any one of the words;
    (b) second programmable and addressable means, for addressing with selected address words said first addressable memory, including a second addressable memory for storing a plurality of starting address words identifying starting addresses, and means, in communication with the storage means and the second addressable memory, for selecting either a starting address word from the second addressable memroy or a next address word from the storage means in response to a select control signal; and
    (c) means for generating the clocking signal and the select control signal in response to the triggering signal.

6. A programmable event generator, according to claim 5, wherein said means for selecting comprises a multiplexer.

7. A programmable event generator, according to claim 5, wherein said second programmable and addressable means further comprises a latch for latching an external address, said second addressable memory being coupled to said latch to output a starting address word in response to the latched external address.

8. A programmable event generator, according to claim 5, wherein said means for generating a clocking signal comprises:
    (a) means for generating a start signal in response to the triggering signal; and
    (b) means for generating an internal clock in response to the start signal, the internal clock being said clocking signal.

9. A programmable event generator, according to claim 8, wherein at least one of the words further includes a stop word, wherein the triggering signal has a trailing edge, and wherein said means for generating a start signal is further in communication with the storage means and generates a stop signal in response to either the stop word or the trailing edge, said internal clock generating means stopping the generation of the internal clock in response to the stop signal.

10. A programmable event generator, according to claim 8, wherein said internal clock generating means is elected to generate the internal clock at a frequency determined by user programming.

11. A programmable event generator, according to claim 8, wherein the triggering signal has one or another polarity, and wherein said start signal generating means is programmable to respond to either polarity of the triggering signal.

12. A programmable event generator, according to claim 5, wherein said first addressable memory and said second addressable memory are each a programmable read only memory.

13. A programmable event generator, according to claim 5 further comprises:
(a) a third addressable test memory, coupled to said storage means, for storing and outputting test data words to said storage means in response to a test address word; and
(b) a fourth addressable test memory, coupled to said third addressable memory, for storing and outputting at least one starting test address word to address said third addressable test memory.

14. The apparatus of claim 5, wherein the storage means comprises a storage register.

15. An apparatus for generating digital timing waveforms in response to a triggering signal, comprising:
means for storing and outputting words including an addressable memory for storing the words at locations identifiable by address words, the words including data words corresponding to the digital timing waveforms and next address words;
means for addressing said addressable memory in response to selected address words including means, having a first input connected to receive next address words outputted by the means for storing and outputting having second input connected to receive starting address words and having a control input connected to receive a select control signal, for selecting a next address word or a starting address word as a selected address word; and
means for supplying the starting address words to the means for selecting;
means, in communication with the means for storing and outputting and connected to receive the triggering signal, for controlling in response to the triggering signal said storing and outputting means to output the words and for generating the select control signal.

16. Apparatus, according to claim 15, wherein the digital timing waveforms are generated in synchronization with the triggering signal.

17. Apparatus, according to claim 15, wherein the triggering signal has a waveform and wherein the digital timing waveforms do not necessarily resemble the waveform of the triggering signal.

18. Apparatus, according to claim 15, wherein said addressable memory is a programmable read only memory.

19. Apparatus, according to claim 15, wherein said means for storing and outputting further comprises a storage register, coupled to said addressable memory, for temporarily storing and outputting any one of the data words.

20. Apparatus, according to claim 15, wherein said means for supplying comprises:
(a) another addressable memory for storing and outputting any one of a plurality of starting address words identifying a starting address; and
(b) means for receiving and decoding an external address to access the other addressable memory to output one of the plurality of starting address words.

21. Apparatus, according to claim 15, wherein said means for controlling comprises:
(a) means for generating a start signal in response to the triggering signal; and
(b) means for generating a clock to clock said storing and outputting means in response to the start signal.

22. Apparatus, according to claim 15, wherein the triggering signal has a leading edge and a trailing edge, and wherein said means for controlling comprises:
(a) means for generating a start signal in response to the leading edge and a stop signal in response to the trailing edge; and
(b) means for generating a clock in response to the start signal to clock said storing and outputting means and for inhibiting the clock in response to the stop signal.

23. Apparatus, according to claim 15, wherein at least one of the words further includes at least one stop word, and wherein said controlling means controls said storing and outputting means in response to the stop word to inhibit the output of the data words.

24. Apparatus, according to claim 15, wherein said means for controlling comprises programmable means for generating a clock of a selected frequency to clock said storing and outputting means.

* * * * *